United States Patent [19]
Zimmermann et al.

[11] Patent Number: 5,921,474
[45] Date of Patent: Jul. 13, 1999

[54] VALVE HAVING A NOZZLE PLATE PROVIDED WITH A PLURALITY OF RADIALLY RUNNING SLOTS

[75] Inventors: Georg Zimmermann; Horst Magenau, both of Gerlingen; Jürgen Buehring; Gilbert Moersch, both of Stuttgart; Joerg Heyse, Markgröningen; Harald Koenig, Rennigen, all of Germany

[73] Assignee: Robert Bosch GmbH, Stuttgart, Germany

[21] Appl. No.: 08/809,342

[22] PCT Filed: May 3, 1996

[86] PCT No.: PCT/DE96/00769

§ 371 Date: Mar. 12, 1997

§ 102(e) Date: Mar. 12, 1997

[87] PCT Pub. No.: WO97/05377

PCT Pub. Date: Feb. 13, 1997

[30] Foreign Application Priority Data

Jul. 29, 1995 [DE] Germany ............... 195 27 846

[51] Int. Cl.⁶ .............. F02M 51/00; B05B 1/14
[52] U.S. Cl. ............. 239/585.1; 239/900; 239/590.3; 239/596
[58] Field of Search ............... 239/585.1–585.5, 239/900, 596, 590.3, 590.5, 553.5

[56] References Cited

U.S. PATENT DOCUMENTS

| | | | |
|---|---|---|---|
| 4,057,190 | 11/1977 | Kiwior et al. | 239/585.1 X |
| 4,854,024 | 8/1989 | Grieb et al. | |
| 4,923,169 | 5/1990 | Grieb et al. | 239/585.5 X |
| 4,934,653 | 6/1990 | Grieb et al. | 239/585.5 X |
| 4,958,430 | 9/1990 | Grieb et al. | |
| 5,492,277 | 2/1996 | Tani et al. | 239/585.5 X |
| 5,685,485 | 11/1997 | Mock et al. | 239/596 X |
| 5,765,750 | 6/1998 | Pace et al. | 239/590.3 X |

FOREIGN PATENT DOCUMENTS

A 27 23 280  12/1977  Germany.

*Primary Examiner*—Lesley D. Morris
*Attorney, Agent, or Firm*—Kenyon & Kenyon

[57] ABSTRACT

The valve in accordance with the present invention possesses a nozzle plate, which is distinguished by a plurality of narrow slots being provided in it as outlets for fuel. These slots are arranged running radially in a star shape, the individual slots not having a common point of contact. A uniform, very fine atomization of the fuel is possible with this arrangement without additional energy. A consequence of disintegrating into very small droplets is that the exhaust emission of an internal combustion engine can be further reduced and a reduction in fuel consumption can also be achieved. The valve is suited particularly for use in fuel injector systems of mixture-compressing internal combustion engines having externally supplied ignition.

15 Claims, 3 Drawing Sheets

VALVE HAVING A NOZZLE PLATE PROVIDED WITH A PLURALITY OF RADIALLY RUNNING SLOTS

FIELD OF THE INVENTION

The present invention concerns a valve, in particular a fuel injection valve, and a method for manufacturing the valve.

BACKGROUND INFORMATION

A fuel break off element realized in the form of an even, thin plate having numerous curved, narrow slots on a fuel injector downstream from a dosing opening is already known from Unexamined German Patent Application No. 27 23 280. The geometric dimensions (i.e., radial width and curve length) of the curved slots, which are produced in the plate by etching, assure that a fuel veil is formed which breaks out in small droplets. The curved slots that are always arranged in groups break up the fuel according to their geometry which is produced horizontally. The individual slot groups must be produced very exactly in relation to one other so that the fuel is broken off in the desired manner. The curved slots each have a constant opening width over the entire axial extent of the break-off element. The inherent danger of this slot configuration is that "drops" will recombine to form larger drops.

SUMMARY OF THE INVENTION

The advantage of the valve in accordance with the present invention, is that a uniform, very fine atomization of the fuel is achieved with a very high atomization quality, without additional energy. This is achieved in that a nozzle plate provided on the fuel injector has a plurality of slots that run radially, so that the fuel to be spray-discharged forms a plurality of flat jets (flat lamellae) with low fluid lamella thickness directly downstream from the nozzle plate (radial gap nozzle). Due to the surface tension, the entire fuel cone of the flat jets becomes increasingly thinner in the downstream direction and, thus, with increasing diameter in its fuel film thickness, until it disintegrates into very small droplets. These fine droplets have a "Sauter Mean Diameter" (SMD) that is reduced as compared with the state of the art, thus, a reduced mean drop diameter of the spray-discharged fuel, SMDs of <60 $\mu$m being attainable. As a consequence, inter alia, the exhaust emission of an internal combustion engine can be further reduced and a reduction in fuel consumption can also be achieved.

An additional advantage is attained from the arrangement in accordance with the present invention, in that a uniform distribution of the spray-discharged fuel is achieved over a comparatively large spray-discharge surface. As a result, there is a lower droplet packing density in the generated fuel spray, and efficient intermixing with the induction pipe air flow of the internal combustion engine. Moreover, the danger of droplets coagulating, i.e., recombining into larger drops, is lessened.

An S-shaped flow pattern of the fluid is produced by the radial offset of the slots in the radial gap nozzle vis-à-vis the entrance into a nozzle plate recess upstream from the slots. As a result, the flow obtains a radial velocity component which is not lost even upon emergence.

The "S-impact" with the strong flow deviations causes heavy, atomization-promoting vorticity to be impressed upon the flow.

The present invention includes a manufacturing method involving repeated electrodeposition and micropatterning, using, for example, a laser or diamond cutting. The present invention also includes a manufacturing method using erosion.

DETAILED DESCRIPTION OF THE INVENTION

Figure 1:
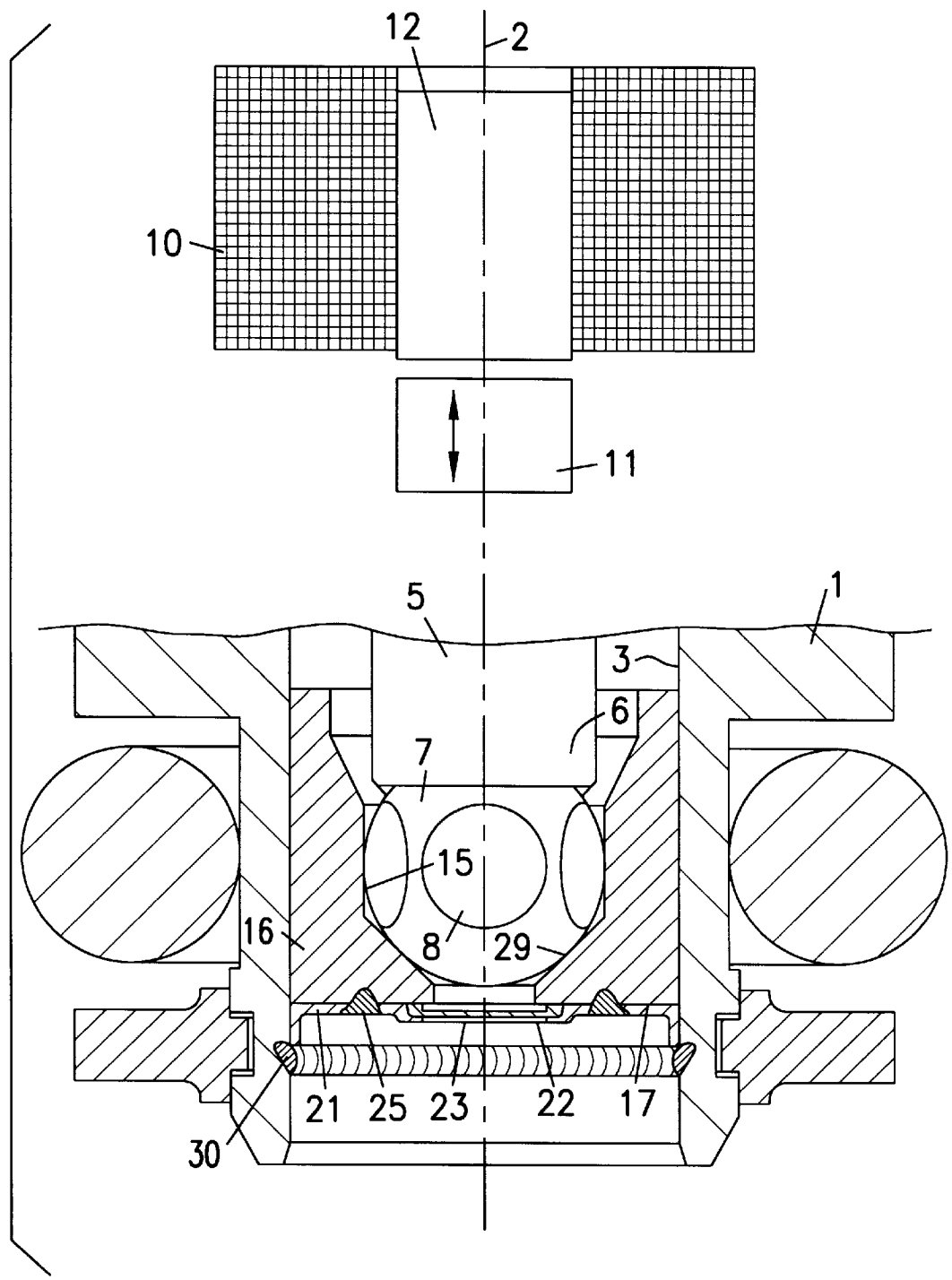
FIG. 1 illustrates a partially depicted injector with a nozzle plate according to one embodiment of the present invention.

A valve according to one embodiment of the present invention, specifically an injector for fuel injection depicted in FIG. 1. The injector has a tubular valve seat support 1 in which a longitudinal opening 3 is formed concentrically to a longitudinal valve axis 2. Located in longitudinal opening 3 is a tubular valve needle 5, for example, which is connected at its downstream end 6 to a spherical valve-closing member 7, for example, on whose periphery are five flattened areas 8, for example.

The injector is actuated in a known manner, for example, electromagnetically. An indicated electromagnetic circuit having a solenoid coil 10, an armature 11, and a core 12 is used to axially move valve needle 5 and, thus, to open the injector against the spring resistance of a restoring spring (not shown) or to close the injector. Armature 11 is joined to the end of valve needle 5 facing away from valve-closing member 7, for example, by a weld seam by means of a laser, and aligned with core 12.

A guide opening 15 of a valve seat member 16 is used to guide valve-closing member 7 during axial movement. The, e.g., cylindrical valve seat member 16 is tightly mounted by means of welding in longitudinal opening 3 that runs concentrically to longitudinal valve axis 2 in the end of valve seat support 1 that lies downstream and is opposite from the core 12. On its lower face 17 opposite valve-closing member 7, valve seat member 16 is concentrically and permanently connected to a support plate 21 formed in a pot-shaped manner, for example, which directly abuts valve seat member 16. Support plate 21 is similar in form to the already mentioned pot-shaped spray-orifice plates, a center area of support plate 21 being provided with a stepped passage opening 22 to accept a nozzle plate 23 in accordance with the present invention.

Valve seat member 16 and support plate 21 are joined, for example, via a circumferential and impervious first weld seam 25 that is formed by means of a laser. This type of assembly avoids the danger of an undesired deformation of support plate 21 in its center area with passage opening 22 and nozzle plate 23 installed in it. In addition, support plate 21 is joined to the wall of longitudinal opening 3 in valve seat support 1, for example, via a second circumferential and impervious weld seam 30.

The insertion depth of the valve seat part that includes valve seat member 16, pot-shaped support plate 21 and nozzle plate 23 in longitudinal opening 3, determines the magnitude of the lift of valve needle 5, since the one end position of valve needle 5, given a non-excited solenoid coil 10, is stipulated by valve-closing member 7 making contact on a valve seat surface 29 of valve seat member 16. The other end position of valve needle 5 is determined, given an excited solenoid coil 10, for example, by armature 11 making contact on the core 12. Thus, the path between these two end positions of valve needle 5 represents the lift.

Spherical valve-closing member 7 cooperates with valve seat surface 29 of valve seat member 16 that is tapered frustoconically in the direction of flow and is formed in the axial direction between guide opening 15 and the lower face 17 of valve seat member 16.

Figure 2:
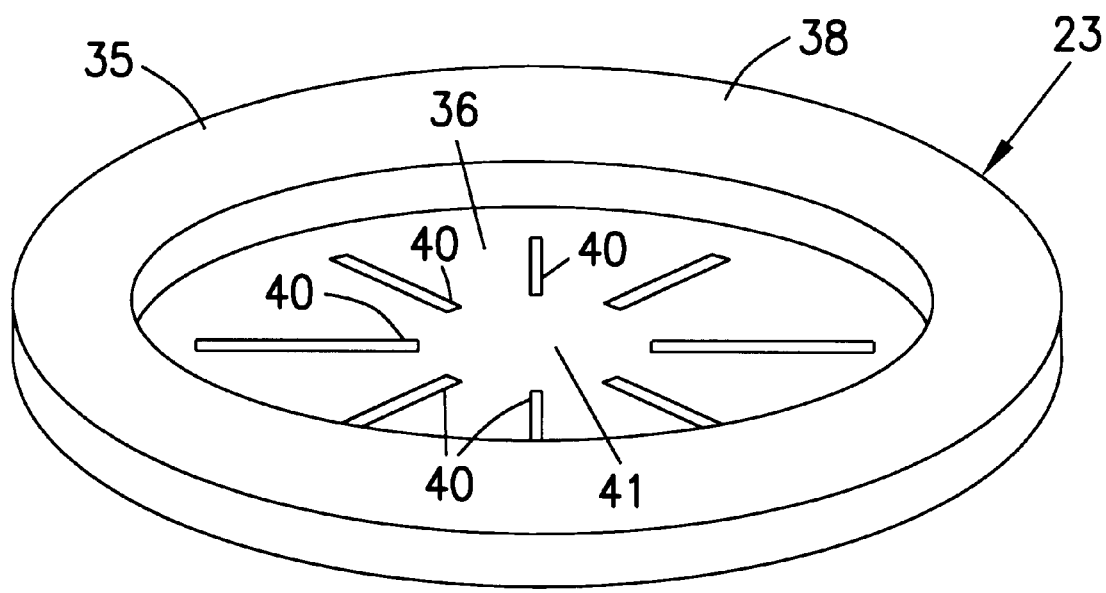
FIG. 2 illustrates a nozzle plate with radial slots according to one embodiment of the present invention.

FIG. 2 shows one embodiment of nozzle plate 23 of the present invention enlarged as an individual component. Nozzle plate 23 is realized as an even, flat, circular plate, an annular outer area 35 being formed more thickly in the axial direction than an inner circular spray-discharge area 36. At 0.2 mm, for example, outer area 35, which completely encircles spray-discharge area 36, has double the thickness of spray-discharge area 36. Nozzle plate 23 is centered in support plate 21. Nozzle plate 23 is fastened to the injector and especially to valve seat member 16, for example, by means of clamping that is possible due to the contour of support plate 21. This type of a clamping, as an indirect fastening of nozzle plate 23 to valve seat member 16, has the advantage that, in contrast to methods such as welding or soldering, temperature-induced deformation of the fine spray-discharge geometry is completely avoided. Stepped passage opening 22 in support plate 21 is fabricated so exactly in terms of dimensions that nozzle plate 23 can be accommodated extremely precisely without stress. Instead of the even outer contour, nozzle plate 23 can also have a stepped outer contour in the axial direction. Support plate 21, however, does not in any way represent an exclusive condition for fastening nozzle plate 23. Since the fastening possibilities are not essential for the present invention, only a reference to normally known joining methods, such as welding, soldering or adhesion should be made here. In a mounted state, an upper face 38 of outer area 35 of nozzle plate 23 abuts the lower face 17 of valve seat member 16 while a hollow space is formed between spray-discharge area 36 and valve seat member 16 because of spray-discharge area 36 that is formed in a recessed manner.

The flatter spray-discharge area 36 of nozzle plate 23 has a plurality of slots 40 running radially, arranged in a star-shaped manner and having a small slot or gap width. Slots 40, through which the fuel is spray-discharged, are distributed uniformly over the periphery of inner spray-discharge area 36, so that quantity distribution in the spray-discharged fuel spray is homogeneous and exhibits the lowest possible spatial droplet packing density. Radial slots 40 do not run up to the center of the plate, since otherwise a compact cord-shaped jet would exit from their intersection point in the center of the plate. Due to the surface tension, a central cord-shaped jet with a poor atomization effect would be generated after exiting from nozzle plate 23. Slots 40 extend up to a largest possible diameter of spray-discharge area 36 so as to make the spray-discharged spray cross-section large to the advantage of a low spatial droplet packing density. Since slots 40 do not have a point of intersection and, thus, no common exit point, there is a slot-free central area 41 in the middle of nozzle plate 23. The limiting walls of slots 40 run vertically as a result of the cost-effective manufacturing using electroforming technology, for example (MIGA technology: micropatterning, electroplating, electroforming).

FIG. 2 shows a nozzle plate 23 according to one embodiment of the present invention having eight uniformly distributed slots 40 spaced apart at 45° angular distances from one another. With an outer diameter of 5.5 mm, nozzle plate 23 has a spray-discharge area 36 with a diameter of 4.2 mm, for example, which results in a width of outer area 35 of 0.65 mm. Slots 40 located in spray-discharge area 36 have a length of 0.9 mm, for example, slots 40 extending in spray-discharge area 36 between an inner diameter of 1.6 mm and an outer diameter of 3.4 mm, for example. The slot width is approx. 25 $\mu$m. Normally, slot widths will be between 20 $\mu$m and 50 $\mu$m.

These examples of dimensional sizes of nozzle plate 23, as well as all other dimensions given in the description are given for further understanding and in no way restrict the present invention. In the same way, the indicated number of slots 40 shall only be understood as exemplary since, four, 12, 16 or other numbers of slots 40 are conceivable at anytime, for example.

A hollow space is revealed upstream from slots 40 due to the thicker formation of outer area 35, so that spray-discharge area 36 represents the base of a recess of nozzle plate 23. This recess is covered partially from the outside by valve seat member 16, it being necessary for slots 40 to be completely covered over their radial extension or length. As a result, an "S-impact" can be achieved in the fluid flow, which makes a uniform, very fine atomization of the fluid possible without additional energy, inter alia. The S-impact with the strong flow deviations causes a heavy, atomization-promoting vorticity to be impressed upon the flow. Since slots 40 are covered, the flow is automatically given a radial component to the outside. This radial flow component is also retained during passage through radially running slots 40. As a result, the flat jet exiting from every slot 40 is spray-discharged diagonally. As a whole, a conical spray consequently exits from the radial gap nozzle with the desired large diameter. The spray cone angle can be varied using various measures. Thus, the distance from the valve seat to slots 40, the degree of coverage of spray-discharge area 36 by valve seat member 16, as well as the radial arrangement of slots 40 all influence the size of the spray cone.

An exemplary embodiment of the present invention (not shown) provides for slots 40 to already be covered by nozzle plate 23 itself, by having a second plate position making it structurally directly a part of nozzle plate 23.

A particularly suitable and preferred manufacturing method for producing nozzle plates 23 according to the present invention is illustrated in more detail on the basis of FIGS. 3 through 8. The Figures do not show exactly the exemplary embodiment of a nozzle plate 23 as illustrated in FIG. 2, rather only arrangements illustrating the manufacturing principle. Due to the stringent requirements placed on the structural dimensions and the precision of injection nozzles, micropatterning methods are gaining in significance today for commercial production of these nozzles. It is characteristic of the method that it also guarantees high precision of the patterns on a large-surface scale, so that it can be used ideally for mass production with large unit numbers. Numerous nozzle plates 23 can be manufactured simultaneously on one wafer.

Figure 3:
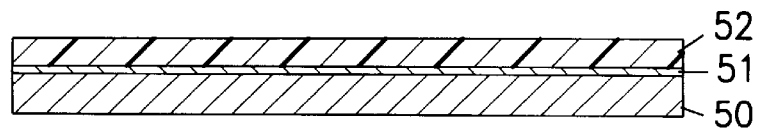
FIG. 3 illustrates a detail of the machining process according to one embodiment of the present invention.

The starting point for the method is an even and stable substrate 50 that can be formed from, for example, of silicon, glass or ceramic. The customary thicknesses of this substrate plate 50 lie between 0.5 mm and 2 mm. After purifying substrate 50, at least one auxiliary layer 51 is electrodeposited onto substrate 50. This is an electrodeposition starting layer (such as Cu), for example, that is required for electrical conduction for subsequent electrodeposition. This auxiliary layer 51 can also be used as a stop layer for the subsequent micropatterning method or as a sacrificial layer, so as to make simple sectioning of nozzle plates 23 possible later, for example via etching. A micropatternable layer 52 is subsequently applied to the entire surface over the auxiliary layer 51. In particular, laminating a thermoplastically deformable plastic (such as polymethyl methacrylate PMMA) is offered for this; this plastic then lies on the auxiliary layer 51 in a film-like manner (FIG. 3).

Figure 4:
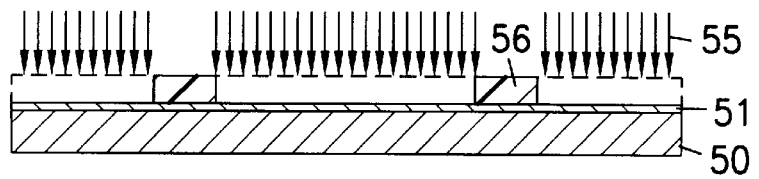
FIG. 4 illustrates laser micropatterning in the machining process according to one embodiment of the present invention.
Figure 5:
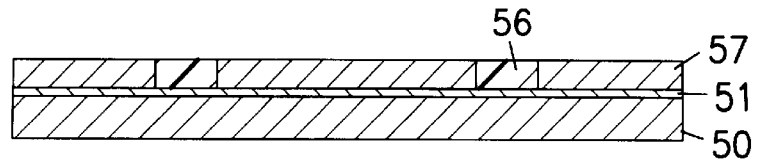
FIG. 5 illustrates electrodeposition according to one embodiment of the method of the present invention.

Layer 52 is now patterned via a mask that is not shown. Particularly due to the high precision, this micropatterning can be performed via diamond cutting or ablation by means of an excimer laser 55 (FIG. 4). Excimer laser 55 that is used to micropattern layer 52, for example, is distinguished by a very high power density and a short wave length (typically $\lambda$=193 nm). After this processing, an electrodeposition mask 56 remains in PMMA layer 52. This pattern in layer 52 represents a negative structure vis-à-vis later nozzle plate 23. Subsequently, metal 57 is electrodeposited around electrodeposition mask 56 in an electroplating bath (FIG. 5). Metal 57 closely abuts the contour of electrodeposition mask 56 as a result of the electrodeposition so that the prescribed contours are reproduced in it true to form. Normally, Ni, NiCo, NiFe or Cu are used in electrodeposition.

Figure 6:
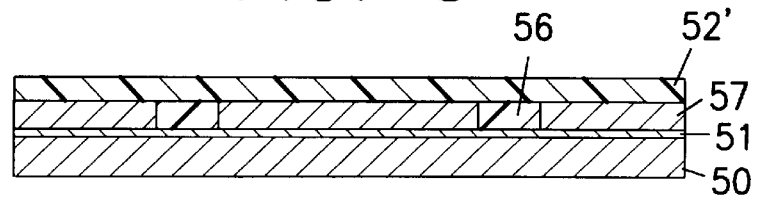
FIG. 6 illustrates repeated layering according to one embodiment of the method of the present invention.
Figure 7:
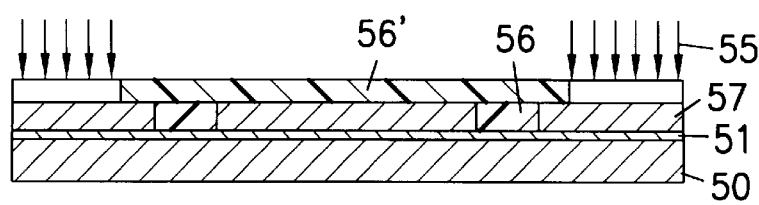
FIG. 7 illustrates repeated laser micropatterning in the machining process according to one embodiment of the present invention.
Figure 8:
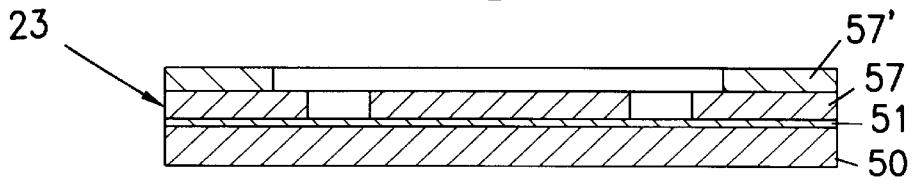
FIG. 8 illustrates the end result of the machining process according to one embodiment of the present invention.

The micropatterning and electroforming process steps can be repeated in accordance with the desired design of nozzle plate 23 (FIGS. 6 and 7). The reference symbols with dashes indicate a repeated process. Electrodeposition masks 56, 56' are removed after the completion of the electrodeposition processes. When using PMMA for layers 52, 52' that are to be patterned, ethyl acetate is especially suited for removal. Subsequent to such dissolving-out, nozzle plate 23 is already present on substrate 50 in a finished embodiment (FIG. 8). Finally, nozzle plates 23 are sectioned. To this end, auxiliary layers 51 are removed by means of etching, and nozzle plates 23 are lifted from substrate 50.

Another very similar manufacturing principle provides for manufacturing molding tools, in accordance with MIGA technology in the form described above, that are formed exactly inversely (negative structure) to the desired nozzle plates 23. Especially high unit numbers of nozzle plates 23 to be formed on the molding tools in this process result in manufacturing that is cost-effective and profitable. As negatives of nozzle plates 23, these molding tools should be processed so exactly that they can be used at least 10,000 times with constant quality. Slots 40 of nozzle plates 23 can also be produced using erosion methods, for example, instead of the methods that have been mentioned so far.

Nozzle plates 23 in accordance with the present invention are generally suited for use when a homogenous, uniform distribution of very fine droplets is supposed to be achieved for spraying fluids, such as paints.

What is claimed is:

1. A valve for a fuel injector of an internal combustion engine, comprising:

a valve needle having a longitudinal valve axis;

a valve seat surface disposed below the valve needle;

a valve closing member connected to the valve needle and cooperating with the valve seat surface; and a nozzle plate disposed downstream from the valve seat surface, the nozzle plate having a plurality of radially running slots forming outlets, the plurality of radially running slots slots being arranged in a star shape and each of the plurality of slots being separate from another of the plurality of slots.

2. The valve of claim 1, wherein each of the plurality of slots has a width in a range of 20 $\mu$m to 50 $\mu$m.

3. The valve of claim 1, wherein the plurality of slots of the nozzle plate includes eight slots, each of the eight slots having a first neighboring slot and a second neighboring slot and each of the eight slots being disposed at a 45 degree angle from its first and second neighboring slots.

4. The valve of claim 1, wherein the nozzle plate includes:

an inner spray discharge area in which the plurality of radially running slots are formed; and an outer area completely encircling the inner spray discharge area.

5. The valve of claim 4, wherein the plurality of radially running slots are recessed relative to an upper face of the outer area.

6. The valve of claim 5, wherein the nozzle plate includes an axial gap, the plurality of radially running slots being covered by the axial gap so that a medium entering the axial gap towards the plurality of slots is diverted in a radial direction.

7. The valve of claim 1, wherein the nozzle plate is manufactured by micropatterning in combination with electroforming.

8. The valve of claim 7, wherein the micropatterning is effected by diamond cutting.

9. The valve of claim 7, wherein the micropatterning is effected by ablation using an excimer laser.

10. The valve of claim 7, wherein the electroforming process includes an electrodeposition mask and the electrodeposition mask is formed from polymethyl methacrylate (PMMA).

11. The valve of claim 1, wherein the plurality of radially running slots are manufactured by erosion.

12. A nozzle plate for use with a fluid distribution valve, wherein the valve has a valve needle having a longitudinal valve axis, a valve seat surface disposed below the valve needle, and a valve closing member connected to the valve needle and cooperating with the valve seat surface, the nozzle plate comprising:

a flat disk disposed downstream from the valve seat surface; and a plurality of radially running slots forming outlets in the disk, the plurality of radially running slots being arranged in a star shape, and each of the plurality of slots being separate.

13. The nozzle plate of claim 12, wherein the valve is a fuel injector valve for use in an internal combustion engine.

14. The nozzle plate of claim 12, wherein the plurality of slots of the nozzle plate includes eight slots, each slot has a first neighboring slot and a second neighboring slot, each slot is disposed at a 45 degree angle from its first and second neighboring slots, and each of the plurality of slots has a width in a range of 20 $\mu$m to 50 $\mu$m.

15. The nozzle plate of claim 14, wherein the nozzle plate includes an inner spray discharge area in which the plurality of radially running slots are formed and an outer area completely encircling the inner spray discharge area, the plurality of radially running slots are recessed relative to an upper face of the outer area, and the plurality of radially running slots are covered by an axial gap so that a medium entering the axial gap towards the plurality of slots is diverted in a radial direction.

* * * * *